June 12, 1934. W. W. GAIRING 1,962,499
LATHE CENTER
Filed June 12, 1930
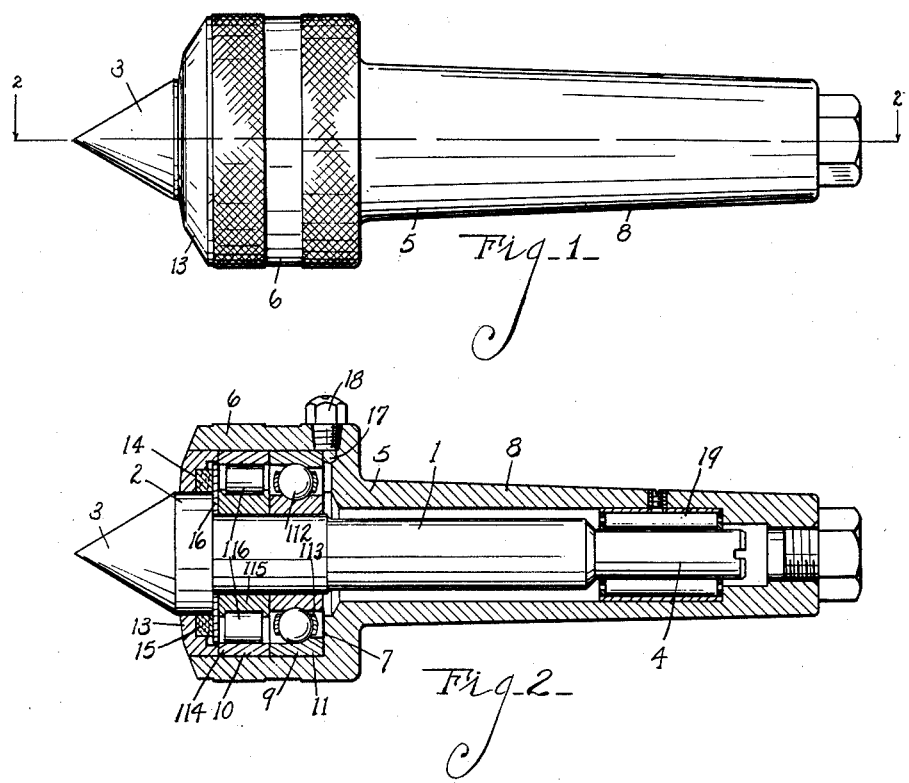
INVENTOR
Walter W. Gairing
BY
Chappell Earl
ATTORNEYS

Patented June 12, 1934

1,962,499

UNITED STATES PATENT OFFICE 1,962,499

LATHE CENTER

Walter W. Gairing, Kalamazoo Township, Kalamazoo County, Mich., assignor to Nielsen, Inc., Lawton, Mich.

Application June 12, 1930, Serial No. 460,565

1 Claim. (Cl. 82—33)

The main object of this invention is to provide an improved lathe center in which the spindle is supported so that it is free from chatter and vibration and so that it is capable of carrying heavy end and radial thrust loads.

A further object is to provide a structure having these advantages which is comparatively simple and economical in its parts and very durable.

Objects pertaining to details and economies of my invention will appear from the description to follow. The invention is defined in the claim.

A structure which embodies the features of my invention is illustrated in the accompanying drawing, in which:

Fig. 1 is a side view of my improved lathe center.

Fig. 2 is a longitudinal section on line 2—2 of Fig. 1, the spindle and anti-friction bearing elements being shown in full lines.

Referring to the drawing, my improved lathe center comprises a spindle 1 having a cylindrical head portion 2 with a conical tip 3 at its outer end. The spindle is provided with a reduced bearing journal portion 4. A holder 5 is provided with a head portion 6 internally shouldered at 7 to provide a seat for the combined radial and thrust bearings. The shank portion 8 of the holder is tubular to receive the spindle.

I provide a pair of combined radial and thrust bearings preferably consisting of two units designated generally by the numerals 9 and 10, the unit 9 being a ball bearing unit and the unit 10 a roller bearing unit.

The roller bearing unit comprises the outer bearing member 114, the inner bearing member 115 and the rollers 116.

The outer bearing members 11 and 114 are a drive or forced fit within the head 6, the member 11 being in supporting engagement with the shoulder 7 of the head and the member 114 in supporting engagement with the member 11.

The inner bearing members are a drive or forced fit on the spindle.

A closure member 13 is pressed into the head of the holder embracing the head of the spindle. This closure member has a shouldered recess 14 on its inner face, the packing ring 15 being arranged in the smaller or reduced portion of this recess, while the retaining ring 16 is arranged on the spindle in supporting engagement with the adjacent inner bearing 114 and between it and the head and projecting into the larger portion of the recess of the closure member, retaining the packing ring in its seat. A lubricant opening 17 is preferably provided having a closure plug 18 or other suitable means for introducing lubricant. A radial bearing 19 of the roller type is provided to coact with the bearing portion 4 at the inner end of the spindle.

My improved lathe center is especially adapted for heavy work; it cannot be thrown out of adjustment by an unskilled workman, and it supports the work without chatter or vibration.

Having thus described my invention, what I claim as new and desire to secure by Letters Patent, is:

A lathe center comprising in combination a spindle having a cylindrical head portion provided with a conical tip at its outer end, a holder comprising an internally shouldered head portion and a tubular shank portion, a pair of main radial and thrust bearings arranged in said head portion of said holder and each comprising an outer bearing member, an inner bearing member and coacting anti-friction members, the outer bearing members fitting within said holder head in abutting edge to edge engagement and with the inner one in supporting engagement with the internal shoulder of the holder head, the inner bearing members being arranged on the spindle, a closure ring fitting within said head in supporting engagement with the adjacent outer bearing member, said closure ring having a recess on its inner side, a packing arranged in said recess to coact with the periphery of said spindle head, and a retaining ring arranged on said spindle between its said head and the adjacent inner bearing member and projecting into said recess in said closure ring.

WALTER W. GAIRING.